2,395,516

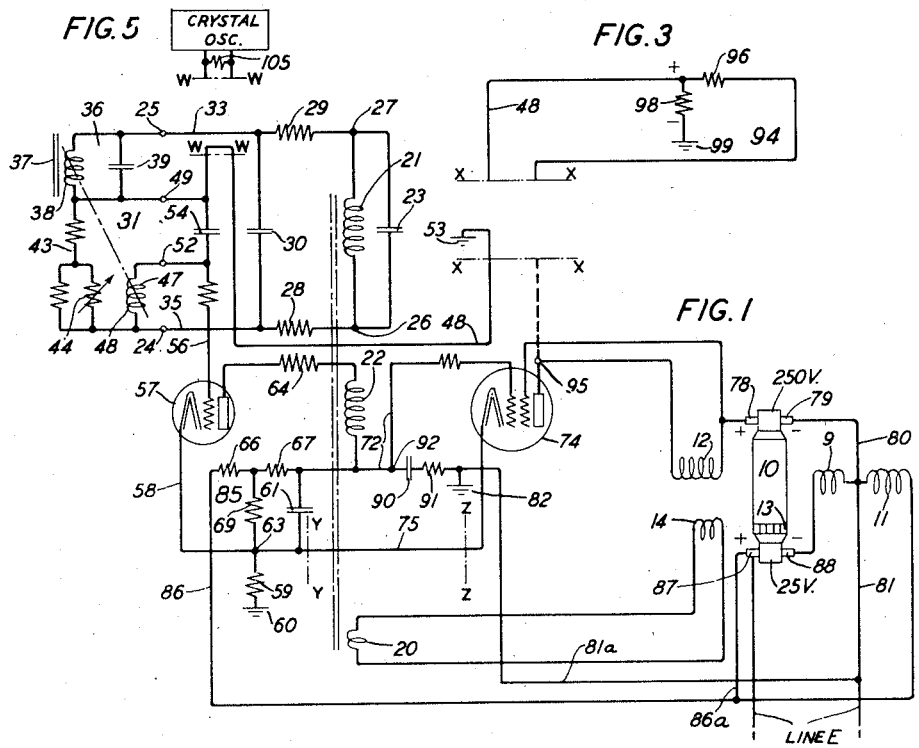
Feb. 26, 1946.  E. R. MORTON ET AL  2,395,516
SPEED CONTROL SYSTEM FOR ELECTRIC MOTORS
Filed Nov. 21, 1942
INVENTORS: E. R. MORTON
H. M. STOLLER
BY
ATTORNEY Patented Feb. 26, 1946

UNITED STATES PATENT OFFICE 2,395,516

SPEED CONTROL SYSTEM FOR ELECTRIC MOTORS

Edmund R. Morton, Brooklyn, N. Y., and Hugh M. Stoller, Mountain Lakes, N. J., assignors to Bell Telephone Laboratories, Incorporated, New York, N. Y., a corporation of New York Application November 21, 1942, Serial No. 466,508

18 Claims. (Cl. 171—312)

This invention relates to a speed control system, and more particularly to such system embodying space discharge apparatus for controlling the speed of electrical motors.

In the prior art, control system embodying space discharge apparatus for regulating the speed of electric motors are disclosed in the patents of H. M. Stoller, Nos. 1,662,084 and 1,662,085 granted March 13, 1928, and No. 1,695,035 granted December 11, 1928. Such systems involve relatively large bulk and weight coupled with a special design of the motor whose speed is to be regulated. The present invention concerns similar speed regulator systems in which both bulk and weight are substantially reduced, and as a consequence is particularly applicable for use with electric motors whose physical location, such as in the field of mobile apparatus, accentuate the need for an economy of bulk and weight.

The present invention contemplates a speed control system embodying electron discharge devices such that both bulk and weight are reduced while at the same time precision is improved.

An object is to provide a speed regulator embodying improved stabilization.

The copending application, Serial No. 466,509, of H. M. Stoller filed November 21, 1942 discloses a speed regulator for an electric motor including a regulating field winding, comprising a generator of an electrical voltage whose frequency is proportional to the motor speed, a frequency discriminating bridge embodying a resonant arm tuned to a certain frequency corresponding to the normal speed of the motor and having conjugate pairs of input and output terminals of which the input terminal pair is applied to said generator, a phase detector tube including in its output circuit effectively a resistor and a capacitor in parallel and having its output circuit applied to said generator and its input circuit connected to the output pair of said terminals, and a power tube having its output circuit arranged to embody the regulating field winding of the motor and its input circuit connected to the resistor and capacitor in the output circuit of the phase detector tube.

In the operation of the foregoing regulator, the frequency discriminating network serves to supply in-phase or out-of-phase voltages, with reference to the generated voltage, to the input of the phase detector tube while at the same time the generated voltage is applied to the output thereof, as the frequency of the generated voltage varies from the certain frequency for any reason at all. As a consequence, the amount of space current flowing in the output of the phase detector tube is increased or decreased to cause corresponding changes in the magnitude of the voltage produced across the resistor embodied effectively in the output of the latter tube. This causes the biasing voltage applied by this resistor to the control grid of the power tube to vary accordingly. This changes the amount of current flowing in the regulating field winding whereby the speed of the motor is adjusted. A circuit embodying a resistor common to the cathode circuits of both the phase detector and power tubes provides regenerative or positive feedback action between these tubes such that the voltage produced across this resistor serves to apply an effective biasing voltage to the control grid of the phase detector tube to control further the amount of current flowing in the regulating field winding of the motor. This serves to provide the motor substantially with a flat speed characteristic. As the frequency discriminating bridge embodies limited sensitivity, such positive feedback is employed to increase the over-all sensitivity of the regulator to such extent that the above-mentioned characteristic of the motor is obtained. When using such positive feedback, it is desirable to utilize at the same time, a suitable arrangement to stabilize the regulator, that is, to provide an anti-hunting control.

The present invention is concerned with the provision of such stabilization arrangement in the foregoing type of speed regulator, and comprises in a specific embodiment a further capacitor and a further resistor disposed in series such that one terminal is connected to the resistor and capacitor in the output circuit of the phase detector tube and thereby to the control grid of the power tube, and its opposite terminal is applied to a point at ground potential. The further capacitor embodies such amount of reactance that the power tube is provided with an amplification versus frequency characteristic in which amplification of alternating current components of the voltage produced across the resistor in the ouput circuit of the phase detector tube decreases as the frequency thereof increases, while the amplification of the direct current component is unchanged.

Another embodiment of the invention contemplates the use of the above stabilization arrangement with positive feedback from the power tube to the phase detector tube in a manner comprising dividing the current flowing in the regulating field winding of the motor into two branches such that the power tube is disposed in one branch while the common resistor is disposed in the other branch, the latter resistor being also directly connected to the control grid of the phase detector tube. This embodiment provides the power tube with the amplification versus frequency characteristic identified above with reference to the specific embodiment of the invention.

A further feature concerns synchronizing the generated wave with a standard wave whose frequency corresponds to that of generated wave at the normal speed of the motor whose speed is to be controlled.

The invention will be readily understood from the following description when taken together with the accompanying drawing in which:

Fig. 1 is a schematic circuit diagram of a speed regulator embodying a specific embodiment of the invention;

Fig. 2 is a curve showing certain action obtainable in Fig. 1;

Figs. 3 and 4 are fragmentary schematic circuit diagrams to be included in Fig. 1 to provide another embodiment of the invention; and Fig. 5 is a box representative of a source of an alternating wave of standard frequency with which the operation of Fig. 1 may be synchronized.

Referring to Fig. 1, a dynamotor 10 embodies series field winding 9, shunt field winding 11, regulating field winding 12 to control the speed of the dynamotor 10, and a toothed rotor 13 and associated stator winding 14 to generate a pilot alternating wave whose frequency is proportional to the speed of the dynamotor 10 as disclosed in the copending application of H. M. Stoller, Serial No. 450,037 filed July 7, 1942. The pilot wave generating winding 14 is extended to electrical winding 20 which is inductively coupled to both electrical windings 21 and 22. The winding 21 shunted by a capacitor 23 and connected across terminals 26 and 27 is also applied to input terminals 24 and 25 of a frequency discriminating network 31 in a manner that will now be explained. Serially connected between the terminals 24 and 26 is a resistor 28; serially connected between the terminals 25 and 27 is a resistor 29; and connected in shunt of the bridge input terminals 24 and 25 is a capacitor 30.

The bridge 31 disclosed in the copending application, Serial No. 466,507, of H. M. Stoller filed November 21, 1942, comprises a first arm 36 embodying a molybdenum-permalloy dust core 37 onto which is applied an electrical winding 38 to constitute an inductance coil which together with a capacitor 39 connected in parallel therewith forms a resonant circuit tuned to a certain frequency corresponding to the normal speed of the dynamotor 10, which frequency, for the purpose of this illustration, is assumed to be 720 cycles per second. The bridge 31 also includes a second arm 43 which is a resistive network including a thermoresponsive element 44 to compensate for changes in the resistance value of the winding 38 over a predetermined range of variation in ambient temperature; a third arm 47 which is a further electrical winding 48 applied to the core 37 and coupled inductively to the winding 38 thereon; and a pair of output terminals 49 and 52 across which is applied a capacitor 54 such that one terminal is connected to the bridge output terminal 49 and over lead 48 to a point 53 at ground potential and the opposite terminal is connected to the bridge output terminal 52 and over lead 56 to the control grid of a phase detector tube 57.

The phase detector tube 57 has its cathode connected over a lead 58 including resistor 59 to a point 60 at ground potential. Hence, the input of this tube includes the serial circuit effectively extending between the ground points 53 and 60. The output circuit of the phase detector tube 57 comprises in series its anode cathode, lead 58, point 63, resistor 69, resistor 67, winding 22, resistor 64 and back to its anode. A capacitor 61 is disposed in shunt of the resistors 67 and 69. For the purpose of this illustration, the resistance value of the resistor 67 was found to be of the order of 250,000 ohms, the resistance value of the resistor 69 of the order of 50 ohms, and the capacitance of the capacitor 61 of the order of 0.05 microfarad. A joint terminal of the resistor 67 and capacitor 61 is applied over lead 72 to the control grid of a power tube 74 whose cathode is connected over lead 75 to terminal 63 which is common to both the input circuit of the phase detector tube 57 and the output circuit of the power tube 74. Due to the large difference between the resistance values of resistors 67 and 69, the resistor 69 supplies, under the influence of the output circuit of the tube 57, a negligible voltage to the control grid of the tube 74. Hence, the voltage produced across the resistor 67 in a manner to be explained hereinafter and applied to the control grid of the power tube 74 serves to control the amount of space current flowing therein. The plate of the power tube 74 is connected through the regulating winding 12, (+) brush 78, (—) negative brush 79, both of which brushes are applied to the 250-volt commutator of the dynamotor 10, and leads 80, 81 and 81a to a ground point 82. The (+) dynamotor brush 78 is also connected to the screen grid of the power tube 74 so that the +250-volt potential is also supplied thereto. Thus, the (+) terminal of the 250-volt source, which is applied to both the regulating field winding 12 and screen grid of the power tube 74, is fixed relative to the ground point 82.

A potentiometer 85 comprising resistors 59, 69 and 66 has one terminal connected to the ground point 60 and the opposite terminal applied over leads 86 and 86a, (+) brush 87, (—) brush 88, both of which brushes are applied to the 25-volt commutator of the dynamotor 10, series winding 9, and leads 81 and 81a to the ground point 82. Line voltage E is applied across (+) brush 87 engaging the 25-volt dynamotor commutator and lead 81 extended through series winding 9 to the (—) brush 88 engaging the 25-volt dynamotor commutator. The potentiometer 85 supplies a positive biasing voltage of a certain fixed magnitude to the control grid of the power tube 74 and a negative biasing voltage of a certain fixed magnitude to the control grid of the phase detector tube 57 whereby a certain amount of direct current is furnished to the regulating field winding 12 to effect operation of the dynamotor 10 at normal speed, which for the purpose of this illustration is assumed to be 7200 revolutions per minute. The effective negative biasing voltage applied to the control grid of the phase detector tube 57 is due: (a) to the current flow in the potentiometer circuit extending between ground points 82 and 60 as above traced, and (b) to the regenerative or positive feedback circuit extending between the power tube 74 and phase detector tube 57 and comprising anode-cathode of power tube 74, lead 75, common point 63, biasing resistor 59, ground points 60 and 82, leads 81a, 81 and 80, brushes 79 and 78 engaging the 250-volt commutator of the dynamotor 10, regulating field winding 12 and back to the anode of the power tube 74.

In the operation of the above-described circuit of Fig. 1, the dynamotor may be caused to run at normal speed of 7200 revolutions per minute or speeds above or below normal so that the frequency of the pilot wave generated in the winding 14 will be normal, which frequency is assumed to be 720 cycles per second for the purpose of this illustration, or above or below 720 cycles per second. When the pilot wave applied to the terminals 26 and 27 of the winding 21 possesses the certain frequency of 720 cycles per second, a balanced condition is established in the bridge 31 so that no output wave is caused to appear at its output terminals 49 and 52. Consequently, no change occurs in the amount of space current flowing in the phase detector tube 57, and hence no change takes place in the magnitude of the biasing voltage produced across the resistor 67. This means that the biasing voltage impressed on the control grid of the power tube 74 remains normal so that the normal amount of current is caused to flow in the regulating winding 12 whereby the dynamotor is caused to operate at the normal speed of 7200 revolutions per minute.

When the pilot wave applied to the terminals 26 and 27 varies from 720 cycles per second for any reason at all, the bridge 31 is unbalanced and an alternating wave is caused to appear at its output terminals 49 and 52. This output wave is approximately 180 degrees out-of-phase with reference to the pilot wave applied to the terminals 26 and 27 if the frequency of the pilot wave is higher than the frequency at which the bridge is balanced, and approximately in-phase with the pilot wave applied to the terminals 26 and 27 if the frequency of the pilot wave is below the frequency at which the bridge is balanced. This means that the waves supplied simultaneously to the input and output circuits of the phase detector tube 57 are approximately either 180 degrees out-of-phase or in-phase. Consequently the amount of space current flowing in the latter tube is caused either to decrease or increase whereby the voltage produced across the resistor 67 is correspondingly varied. Hence, the effective biasing voltage impressed on the control grid of the power tube 74 is rendered either less or more negative. This serves to increase or decrease the amount of current flowing in the regulating field winding 12 whereby further changes in the speed are prevented. The bridge 31 is effective for the above operation over a band width of the order of ±20 per cent of the certain frequency of 720 cycles per second.

As the amount of current flowing in the regulating field winding 12 increases or decreases in response to corresponding variations in the speed in the manner above described, such current variations effect, through the positive feedback circuit hereinbefore traced, variations in the magnitude of the effective negative biasing voltage produced across the biasing resistor 59 and applied to the control grid of the phase detector tube 57. These biasing voltage variations cause further increases or decreases in the amount of current flowing in the regulating field winding 12. The net result of this positive feedback operation is the establishment of an equilibrium speed, for a relatively wide range variation in the amount of current flowing in the regulating field winding at a value which approximates the normal speed of 7200 revolutions per minute. In other words, the characteristic comprising speed versus primary variable (such as line voltage, load and/or ambient temperature) is substantially flat as compared with a similar characteristic having a finite slope which latter characteristic identifies a speed regulator system operating without positive feedback action of the type above mentioned. The above regulator arrangement and operation are further explained in the copending application of H. M. Stoller, supra.

As pointed out in the latter copending application, it was found desirable to use compensation of the positive feedback type with the bridge 31 designed to possess moderate sensitivity rather than to use a bridge 31 designed to possess extremely fine sensitivity and thereby to require little or no compensation of the positive feedback type mentioned above. An extremely sensitive bridge 31 would require suitable auxiliary apparatus for starting the dynamotor while the bridge 31 of moderate sensitivity provides reliable, automatic self-starting for the dynamotor without the need of an auxiliary starting arrangement, and, in addition, is more stable at its normal operating speed when subject to load, line voltage, and/or ambient temperature changes. However, when employing positive feedback to compensate the bridge 31 for lack of sensitivity, it is also necessary to employ a stabilizing or anti-hunting arrangement.

A specific embodiment of the present invention concerns the provision of a stabilizing or anti-hunting arrangement by serially connecting a network comprising a capacitor 90 and a resistor 91 intermediate a point 92 embodied in the lead 72 and the ground point 82. Thus, the capacitor 90 and resistor 91 are effectively connected to the control grid of the power tube 74. For the purpose of this illustration, it has been found that the optimum capacitance of the capacitor 90 is 0.5 microfarad, and the optimum resistance value of the resistor 91 is 100,000 ohms. For direct current components of the voltage produced across the resistor 67, the capacitor 90 and resistor 91 constitute effectively an open circuit. However, for alternating current components of the same voltage having frequencies of the order of 2 cycles per second or more, the magnitude of the reactance of the capacitor 90 is appreciable thereby effectively connecting the resistor 91 to ground, in parallel with the serially connected resistors 67, 69 and 59. In this connection, adjacent terminals of the resistor 67 and the serially connected capacitor 90 and resistor 91 are connected to the common point 92 while their opposite terminals are effectively applied to the respective ground points 60 and 82.

The voltage produced across the resistor 67 and supplied to the control grid of the power tube 74 can be resolved by Fourier's series analysis into a direct current component corresponding to the steady state equilibrium value of the circuit of Fig. 1, and alternating current components comprising frequencies extending over a range for example from 0 to 10 cycles. The amplitude coefficients of the several frequency components will decrease with increasing frequency, becoming negligible at higher frequencies. The capacitor 90 and resistor 91 constituting a frequency selective network in parallel with the resistors 67, 69 and 59 give an impedance frequency characteristic, illustrated in Fig. 2. Thus, the capacitor 90 and resistor 91 provide the power tube 74 with such amplification versus frequency characteristic that amplification decreases as the frequencies of the alternating components of the grid voltage supplied thereto by the coupling resistor 67 increase as shown in Fig. 2. As previously explained the amount of positive feedback provided in the circuit of Fig. 1 has been selected to give a substantially flat speed versus primary variable characteristic for the direct current component of the voltage applied to the control grid of the power tube 74. Since amplification decreases as the frequencies of the alternating current components increase, the circuit of Fig. 1 will be undercompensated for alternating current components, the degree of such compensation following a drooping frequency characteristic in accordance with Fig. 2.

It is a well-known property of speed regulators of all types that stability improves as positive compensation is reduced, thereby giving more droop in the speed characteristic. Thus, to obtain stability it is necessary that the compensation should be sufficiently reduced at the lowest frequency at which the system is capable of hunting which in the particular case above cited is ten cycles per second. The "natural period" of hunting frequency is determined by the over-all combination of electrical and mechanical constants (such as load inertia) of the system and may vary over a limited range say, for example, in this case from 7 to 14 cycles per second.

It has been found that the optima values of the capacitance of capacitor 90 and resistance value of the resistor 91 are related to both the electrical and mechanical constants of Fig. 1. In this connection the resistance value of the resistor 91 should be of the order of half the resistance value of the resistance 67 in the output of the phase detector tube 57; and the capacitance value of the capacitor 90 should be such that, at the lowest frequency of the current to be transmitted in Fig. 1, its impedance is of the same order of magnitude as the resistance value of the resistor 91. Thus, if the mechanical moment of inertia of the dynamotor is relatively large, or if a flywheel of considerable inertia is present in the load connected to the dynamotor, then the "natural period" of the hunting frequency will be reduced below that hereinbefore mentioned.

An alternative arrangement for providing positive feed-back or regenerative action in order to obtain substantially flat regulation coupled with stability is shown in Figs. 3 and 4, both of which are to be substituted in Fig. 1. In this connection it is understood that Fig. 3 is to be substituted for the circuit portion shown above the line X-X of Fig. 1; and Fig. 4 is to be substituted for the circuit portion shown between the lines Y-Y and Z-Z of Fig. 1. From such substitution, it is seen that the circuit portion of Fig. 4 serves to apply ground point 101 directly to the cathode of the power tube 74, and at the same time to interrupt the feedback lead 75 connecting the latter cathode and the biasing resistor 59; and the circuit portion of Fig. 3 serves to interpose a potentiometer 94 between the point 95 located in the output circuit of the power tube 74 and ground. This potentiometer comprises resistors 96 and 98 arranged in series, the bridge terminal 49 being connected to the positive terminal of resistor 98 over the lead 48.

In the operation of the Figs. 1, 3 and 4, steady state equilibrium and stabilization are achieved substantially to the extent mentioned above concerning Fig. 1. The alternative arrangement of positive feedback will now be explained with reference to Figs. 1, 3 and 4.

The current flowing in the regulating field winding 12 commences at the (+) brush 78 of dynamotor and passes through the regulating field winding 12 to point 95 where it divides. The main portion of this current flows in a circuit comprising anode-cathode of the power tube 74, ground point 101 connected to the cathode of the latter tube as shown in Fig. 4, thence to ground point 82, leads 81a, 81 and 80, brushes 79 and 78 engaging the 250-volt commutator of the dynamotor. At the same time the remaining portion of the regulating field current flows in a circuit comprising point 95, resistors 96 and 98 to ground point 99, thence via ground point 82, leads 81a, 81 and 80, (−) brush 79 engaging the 250-volt commutator of the dynamotor, and back to the (+) brush 78 engaging the same commutator. The potential produced across the resistor 98, Fig. 3, is effectively interposed in series with the effective charge on the capacitor 54 which latter charge is applied across the output terminals 49 and 52 of the bridge network 31 as above pointed out.

As the voltage across the power tube 74, Figs. 1, 3 and 4, increases or decreases under the above described control from the phase detector tube 57, the magnitude of the positive bias potential developed across the resistor 98, Fig. 3, increases or decreases in a corresponding manner to effect further changes in the amount of space current flowing in the phase detector tube 57. This causes further changes in the magnitude of the biasing voltage produced across the coupling resistor 67 and impressed on the control grid of the power tube 74 to vary further the effective impedance of the latter tube whereby the amount of current flowing in the regulating field winding 12 is controlled.

For example, when the power tube 74 has a mean value of impedance, corresponding to normal speed of the dynamotor, the potential developed across the resistor 98, Fig. 3, provides a corresponding normal value of effective biasing potential to the control grid of the phase detector tube 57. When for any reason at all, the amount of current flowing in the output circuit of the power tube 74 is increased, the magnitude of the potential developed across the resistor 98, Fig. 3, is correspondingly reduced, thereby increasing further the effective negative biasing potential impressed on the control grid of the phase detector tube 57 thereby causing the amount of space current flowing therein to decrease. This results in a decrease in the magnitude of the biasing potential produced across the coupling resistor 67, Fig. 1, whereby the control grid of the power tube 74 is rendered less negative. As a consequence, the amount of current flowing in the output circuit of the power tube 74 is further increased, thereby increasing further the amount of current flowing in the regulating field winding 12 and thus providing positive regenerative feedback.

When for any reason at all, the amount of current flowing in the output circuit of the power tube 74 is decreased, the magnitude of the potential developed across the resistor 98, Fig. 3, is correspondingly increased to decrease further the effective negative biasing impressed on the control grid of the phase detector tube 57 thereby causing the amount of space current flowing therein to increase. This occasions an increase in the magnitude of the negative biasing potential produced across the coupling resistor 67, Fig. 1, whereby the control grid of the power tube 74 is rendered more negative. As a result, the amount of current flowing in the output circuit of the power tube 74 and regulating field winding 12 is further decreased. This action again provides positive regenerative feedback.

A feature of Figs. 1, 3 and 4 is that the (—) brush 79 engaging the +250-volt commutator is applied directly over the leads 80, 81 and 81a to the ground point 82. This permits the cathodes of the detector tube 57 and power tube 74 to be connected directly to ground potential through relatively low impedance paths; and simplifies the design of the dynamotor whose speed is to be controlled.

A crystal controlled oscillator, Fig. 5, of the type disclosed in the copending application of H. M. Stoller, supra, and relating to the over-all speed regulating system may be employed to introduce serially into the input of the phase detector tube 57 a standard alternating wave fixed as to both frequency and magnitude and produced across resistor 105, Fig. 5. This standard wave exerts an average negligible effect at all speeds except the assumed synchronous speed of 7200 revolutions per minute. At the synchronous speed the regulator of Fig. 1 is locked in with the standard wave; and the pilot wave assumes a phase angle $\theta$ (approximately 90 degrees for this illustration) with reference to the standard wave. A momentary decrease in the speed of the dynamotor for any reason causes the angle $\theta$ to decrease whereby the pilot wave is brought more closely into phase with the standard wave. This occasions an increase in the amount of space current flowing in the output circuit of the phase detector tube 57, and a consequent decrease in the amount of current flowing in the regulating field winding 12.

During the time interval when the angle $\theta$ is decreasing, the frequency of the pilot wave is below the frequency of the standard wave by an amount $$\frac{\Delta \omega}{\omega_0}$$

which amount is proportional to $$\frac{d\theta}{dt},$$

or the slope of the angle $\theta$. Referring to Equation 2 of the copending application of H. M. Stoller involving the frequency discriminating network 31, supra, it will be noted that, when the frequency of the pilot wave is below the certain frequency $f_0$ (720 cycles per second) the bridge 31 delivers to its output terminals 49 and 52 an output voltage $$E_{2-3} = E_0 q \frac{\Delta \omega}{\omega_0} \cos \omega t$$

which voltage is approximately in-phase with the pilot voltage present in winding 22 and applied to the output circuit of the phase detector tube 57. This, as above pointed out, effects a decrease in the amount of current flowing in the regulating field winding 12 whereby the speed is prevented from a further decrease. Thus, the action of the bridge 31 is in such sense as to oppose a further decrease in the angle $\theta$, and thereby tends to stabilize further the over-all speed regulating system of Fig. 1.

An increase in the speed for any reason causes the angle $\theta$ to increase whereby the pilot wave is moved further out-of-phase with reference to the standard wave. This occasions a decrease in the amount of current flowing in the output circuit of the phase detector tube 57, and a consequent increase in the amount of current flowing in the regulating field winding 12.

During the time interval when the angle $\theta$ is increasing the opposite effect takes place.

If the nature of the disturbance affecting the angle $\theta$ is such as to produce a relatively sudden change in the latter, then the transient output of the bridge 31 according to Equation 13 of the copending application of H. M. Stoller relating to the frequency discriminating network 31, supra, will apply. This will tend further to stabilize the circuit of Fig. 1.

The practical importance of these effects is evidenced by the experimental fact that when the system of Fig. 1, in synchronism with standard wave, Fig. 5, is operating under steady state conditions it will quickly hunt out of step if the bridge output is momentarily short-circuited.

The network comprising capacitor 90 and resistor 91 functions in the manner hereinbefore explained to provide stability irrespective of positive feedback compensation. Positive feedback of the type previously discussed is provided by the biasing resistor 59 to cause the steady state value of the angle $\theta$ to remain approximately its initial 90 degrees throughout the operating range of regulating field current. This is equally the case when the positive feedback circuit of Figs. 3 and 4 is embodied in Fig. 1.

Although the invention is disclosed with specific application to a direct current motor, it is not limited thereto; and it is to be understood that the invention is equally applicable to alternating current motors employing power tube control of the type, for example, disclosed in the patents of H. M. Stoller, Nos. 1,695,035; 2,116,586; and 2,202,172 granted December 11, 1928, May 10, 1938, and May 28, 1940, respectively.

What is claimed is:

1. In combination in a speed regulator system for an electric motor including a regulating field winding, means to generate an electrical wave whose frequency is proportional to the speed of said motor, means applied to said wave generating means to produce a voltage varying in magnitude in proportion to variations in the frequency of the generated wave with reference to the frequency corresponding to the normal speed of said motor, space discharge means having its output circuit arranged to include said regulating field winding and its input circuit applied to said voltage producing means to respond to variations in the magnitude of the voltage produced thereby for controlling the amount of current flowing in said regulating field winding whereby the speed of said motor is regulated, and frequency selective means interposed between said voltage producing means and the input circuit of said space discharge means and provided with an impedance versus frequency characteristic such that said space discharge means is provided with an amplification versus frequency characteristic in which amplification of the alternating current components of the voltage supplied to the input circuit of said space discharge means decreases as the frequency of the latter components increases, and in which amplification of the direct current component of the latter voltage is substantially unaffected.

2. In combination in a speed regulator system for an electric motor including a regulating field winding, means to generate an electrical wave whose frequency is proportional to the speed of said motor, an electron discharge device whose output circuit embodies said regulating field winding, frequency discriminating means having an input circuit including a resonant circuit tuned to a certain frequency corresponding to the normal speed of said motor and having an output circuit including a resistor, circuit means to apply both the input and output circuits of said frequency discriminating means to said wave generating means and further to apply said resistor to the input circuit of said device such that the voltage produced across said resistor varies in magnitude in proportion to variations in the frequency of the generated wave with reference to the certain frequency and such that these voltage variations are impressed on the input circuit of said device to control the amount of current flowing in said regulating field winding whereby the speed of said motor is regulated, means including a further resistor common to certain circuit portions of both said control means and said device and responsive to the current flowing in said regulating field winding to produce a further voltage for actuating said control means to control further the magnitude of the voltage variations produced across said resistor such that said motor is provided substantially with a flat speed versus primary variable characteristic, and means comprising a capacitor and another resistor in series interposed between a point common to both said resistor and the control grid of said device and a ground point and provided with such impedance versus frequency characteristic that said device possesses an amplification versus frequency characteristic in which amplification decreases as the frequency of the alternating component of the voltage produced across said resistor increases, and in which amplification of the direct current component of the latter voltage is substantially unaffected.

3. A speed regulator for an electric motor having a regulating field winding comprising means to generate an alternating wave whose frequency is proportional to the speed of said motor, a bridge having a resonant arm tuned to a certain frequency of the generated wave corresponding to the normal speed of said motor and further having two pairs of terminals of which one pair is applied to said wave generating means, a space discharge device having its input circuit connected to the other pair of said terminals and its output circuit applied to said wave generating means to produce voltage variations proportional to the frequency variations of the generated wave with reference to the certain frequency, a further space discharge device having its input circuit connected to the output circuit of said device to receive the voltage variations therefrom and its output circuit embodying said regulating field winding, means common to both the control grid-cathode circuit of said device and said regulating field winding to provide regenerative action between both said devices for controlling the effective magnitude of the biasing voltage impressed on the control grid of said device such that substantially a flat speed versus primary variable characteristic for said motor is obtained, and a frequency selective network interposed between a point common to both the output circuit of said device and the input circuit of said further device and a ground point and having an impedance versus frequency characteristic such that said further device possesses different pre-selected amplification versus frequency characteristics for components of different frequencies of the voltage variations received at the input circuit of said further device from the output circuit of said device.

4. The speed regulator according to claim 3 in which said frequency selective network comprises a capacitor and a resistor connected in series.

5. The speed regulator system according to claim 3 in which the amplification versus frequency characteristic of said further device for alternating current components of the voltage variations received in the input circuit thereof is such that amplification decreases as the frequencies of the latter components increase.

6. The speed regulator system according to claim 3 in which the amplification versus frequency characteristic of said further device for the direct current component of the voltage variations received in the input circuit thereof is such that said flat speed characteristic for said motor is substantially unchanged.

7. The speed regulator system according to claim 3 in which said regenerative means includes a resistor common to the cathode circuit of both said space discharge device and said regulating field winding so that the magnitude of the effective biasing voltage produced across said resistor and applied to the control grid of said space discharge device varies in direct proportion to the amount of current flowing in said regulating field winding.

8. The speed regulator system according to claim 3 in which said regulating field winding is effectively interposed in series with two parallel branch circuits one of which includes the anode-cathode circuit of said further space discharge device and the other of which embodies effectively said regenerative means, and said regenerative means includes a resistor common to the control grid-cathode circuit of said space discharge device and said other branch circuit so that the magnitude of the effective biasing voltage produced across said resistor and effectively applied to the control grid of said space discharge device is controlled by the amount of current flowing in said other branch circuit.

9. The speed regulator according to claim 3 in which the negative terminal of the direct current source utilized to energize the anode of said further space discharge device is connected directly to a point at ground potential whereby the potential of the positive terminal of said source is fixed relative to ground potential.

10. The speed regulator according to claim 3 in which said bridge comprises three physical arms of which a first arm embodies a magnetic core, an electrical winding applied to said core, and a capacitor to constitute said resonant arm, a second arm comprises a resistive network, a third arm includes a further electrical winding applied to said core and coupled inductively to said winding, one terminal of said first arm and a joint terminal of both said second and third arms constitute said one pair of said terminals, and a joint terminal of both said first and second arms and a further terminal of said third arm constitute said other pair of said terminals.

11. A speed regulator for an electric motor having a regulating field winding, comprising means to generate an alternating voltage whose frequency is proportional to the speed of said motor, a bridge including a resonant arm tuned to a certain frequency corresponding to the normal speed of said motor and having two pairs of terminals one pair of which is connected to said voltage generating means, said bridge discriminating between frequencies of the generated voltages applied to said one pair of terminals such that no output voltage appears at the other pair of said terminals in response to the certain frequency and such that an output voltage of varying phase relation with reference to the generated voltage appears at the other pair of said terminals in response to frequencies different from the certain frequency, a phase detector tube having its output circuit including a resistor and capacitor in parallel applied to said voltage generating means and its input circuit connected to the other pair of said terminals so that the phase relation between the voltages applied simultaneously to the input and output circuits of said phase detector tube determines the amount of space current flowing in said phase detector tube and thereby the magnitude of the voltage produced across said resistor, a power tube having its output circuit arranged to include said regulating field winding and its control grid applied to said resistor and capacitor to respond to changes in the magnitude of the voltage produced across said latter resistor to control the amount of current flowing in said regulating field winding whereby the speed of said motor is adjusted, regenerative means including a further resistor common to the cathodes of both said phase detector and power tubes for controlling the magnitude of the biasing voltage applied to the control grid of said phase detector tube so that said motor is provided substantially with a flat speed versus primary variable characteristic, and a network comprising a further capacitor and another resistor in series interposed between a point common to one terminal of said resistor and capacitor and the control grid of said power tube and a ground point and provided with an impedance versus frequency characteristic such that said power tube possesses an amplification versus frequency characteristic in which amplification of the alternating components of the voltage produced across said resistor decreases as the frequencies of the latter components increase, and in which amplification of the direct current component of the latter voltage is substantially unchanged.

12. The speed regulator according to claim 11 in which said bridge is substantially effective over a band width of the order of ±20 per cent of the certain frequency.

13. The speed regulator according to claim 11 in which the resistance value of said other resistor of said network is of the order of one-half the resistance value of said resistor in the output circuit of said phase detector tube.

14. The speed regulator according to claim 11 in which the capacitance of said further capacitor of said network is of the order of ten times the capacitance of said capacitor in the output circuit of said phase detector tube.

15. The speed regulator according to claim 11 in which the impedance of said further capacitor of said network is of the same order of magnitude as the resistance value of said other resistor of said network at the natural period of oscillation of said regulator.

16. A speed regulator for an electric motor having a regulating field winding, comprising means to generate an alternating voltage whose frequency is proportional to the speed of said motor, a bridge including a resonant arm tuned to the certain frequency corresponding to the normal speed of said motor and having two pairs of terminals of which one pair is connected to said voltage generating means, said bridge discriminating between frequencies of the generated voltage applied to said one pair of terminals such that no output voltage appears at the other pair of said terminals in response to the certain frequency and such that output voltages of predetermined phase relations with reference to the generated voltage appear at said other pair of said terminals in response to frequencies different from the certain frequency, a phase detector tube having its output circuit including a resistor and capacitor in parallel applied to said voltage generating means and its input circuit connected to the other pair of said terminals so that the phase relation between the voltages applied simultaneously to its input and output circuits determines the amount of space current flowing in said phase detector tube and thereby the magnitude of the voltage produced across said resistor, a power tube having said regulating field winding connected in one portion of its output circuit and its input circuit applied to said resistor and capacitor to respond to changes in the magnitude of the voltage produced across said resistor to control the amount of current flowing in said regulating field winding whereby the speed of said motor is adjusted, regenerative means including a further resistor common to the control grid-cathode circuit of said phase detector tube and another portion of the output circuit of said power tube for controlling the magnitude of the biasing voltage applied to the control grid of said phase detector tube so that said motor is provided substantially with a flat speed versus primary variable characteristic, and a network comprising a further capacitor and another resistor in series interposed between a point common to both one terminal of said resistor and capacitor and the control grid of said power tube and a ground point and provided with an impedance versus frequency characteristic such that said power tube possesses an amplification versus frequency characteristic in which amplification of the alternating components of the voltage produced across said resistor decreases as the frequencies of the latter components increase, and in which amplification of the direct current component of the latter voltage is substantially unaffected.

17. A speed regulator for an electric motor having a regulating field winding, comprising a source of an alternating wave of standard frequency equivalent to the normal speed of said motor, a generator driven by said motor to produce a pilot alternating wave whose frequency is proportional to the speed of said motor, means responsive to frequency variations of the pilot wave with reference to a certain frequency equivalent to the standard frequency and representing the normal speed of said motor to supply corresponding variations of direct current to said regulating field winding whereby the speed of said motor is regulated, said means being further responsive to the relation between the frequencies of the standard and pilot waves to supply further corresponding variations of direct current to said regulating field winding whereby the speed of said motor is further regulated and whereby a synchronous relation is maintained between the frequencies of the standard and pilot waves, and a frequency selective network comprising a serially connected capacitor and resistor interposed in said frequency responsive means and provided with an impedance versus frequency characteristic such that alternating current components produced by said frequency responsive means are attenuated as the frequencies of said latter components increase.

18. A speed regulator for an electric motor having a regulating field winding, comprising a source of an alternating wave of standard frequency equivalent to the normal speed of said motor, a generator driven by said motor to produce a pilot alternating wave whose frequency is proportional to the speed of said motor, means responsive to frequency variations of the pilot wave, with reference to a certain frequency equivalent to the standard frequency and corresponding to the normal speed of the motor, to supply corresponding variations of direct current to said regulating field winding, said frequency responsive means being further responsive to the relation between the frequencies of the standard and pilot waves to supply further corresponding variations of direct current to said regulating field winding whereby the speed of said motor is further regulated and whereby a synchronous relation is maintained between the frequencies of the standard and pilot waves, regenerative means embodied in said current supplying means and responsive to a predetermined amount of the direct current in said regulating field winding to provide said motor with a substantially constant phase angle between the pilot generator and the standard frequency, and a network comprising a serially connected capacitor and resistor interposed in said current supplying means and provided with an impedance versus frequency characteristic such that alternating components generated in said current supplying means are attenuated as their frequencies increase.

EDMUND R. MORTON.
HUGH M. STOLLER.